US012583522B2

(12) United States Patent
Jeong

(10) Patent No.: US 12,583,522 B2
(45) Date of Patent: Mar. 24, 2026

(54) BATTERY PROTECTION STRUCTURE RESISTANT AGAINST FRONTAL COLLISION OF MONOCOQUE VEHICLE

(71) Applicants:Hyundai Motor Company, Seoul (KR); Kia Corporation, Seoul (KR)

(72) Inventor: Seung Min Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 327 days.

(21) Appl. No.: 18/316,418

(22) Filed: May 12, 2023

(65) Prior Publication Data

US 2024/0217583 A1 Jul. 4, 2024

(30) Foreign Application Priority Data

Dec. 29, 2022 (KR) ........................ 10-2022-0188365

(51) Int. Cl.
| | |
|---|---|
| B60K 1/04 | (2019.01) |
| B60L 50/60 | (2019.01) |
| B62D 21/15 | (2006.01) |
| B62D 25/14 | (2006.01) |
| B62D 25/20 | (2006.01) |
| H01M 50/242 | (2021.01) |
| H01M 50/249 | (2021.01) |
| B62D 25/02 | (2006.01) |

(52) U.S. Cl.
CPC .............. B62D 21/155 (2013.01); B60K 1/04 (2013.01); B60L 50/66 (2019.02); B62D 25/145 (2013.01); B62D 25/2018 (2013.01);

*H01M 50/242* (2021.01); *H01M 50/249* (2021.01); *B60K 2001/0438* (2013.01); *B62D 25/025* (2013.01)

(58) Field of Classification Search
CPC ...... B60K 1/04; H01M 50/242; B60L 3/0015; B60Y 2306/01
See application file for complete search history.

(56) References Cited

U.S. PATENT DOCUMENTS

| | | | |
|---|---|---|---|
| 9,895,999 B2 * | 2/2018 | Ohashi | .................... B60K 1/04 |
| 2017/0106913 A1 * | 4/2017 | Schmalzrieth | ....... B62D 21/155 |
| 2019/0276080 A1 | 9/2019 | Otoguro | |

FOREIGN PATENT DOCUMENTS

| | | |
|---|---|---|
| CN | 109204518 A | 1/2019 |
| CN | 111169547 A | 5/2020 |
| CN | 211568103 U | 9/2020 |
| JP | 2004299633 A | 10/2004 |
| JP | 2017065491 A | 4/2017 |
| KR | 20160073856 A | 6/2016 |
| KR | 20220126132 A | 9/2022 |

* cited by examiner

*Primary Examiner* — Jason D Shanske
*Assistant Examiner* — James J Triggs
(74) *Attorney, Agent, or Firm* — Slater Matsil, LLP

(57) ABSTRACT

An embodiment battery protection structure includes a sub frame mounted to a lower portion of a pair of front side members, a stopper provided at a rear portion of the sub frame and aligned with a power electric (PE) mounting part in a longitudinal direction of a vehicle body, the PE mounting part being configured to mount a PE system to the sub frame, and a center side lower member coupled to a center cross member and configured to support a rear portion of the stopper.

18 Claims, 11 Drawing Sheets

BATTERY PROTECTION STRUCTURE RESISTANT AGAINST FRONTAL COLLISION OF MONOCOQUE VEHICLE

CROSS-REFERENCE TO RELATED APPLICATIONS

This application claims the benefit of Korean Patent Application No. 10-2022-0188365, filed on Dec. 29, 2022, which application is hereby incorporated herein by reference.

TECHNICAL FIELD

The present disclosure relates to a battery protection structure.

BACKGROUND

A purpose built vehicle (PBV) is referred to as a vehicle. Such a vehicle is designed to meet the market demand of small quantity production of various kinds, made by combining a drive module related to driving of a vehicle and a life module providing various types of boarding and loading spaces according to market requirements.

Accordingly, there is an advantage in that a vehicle that meets the market demand can be quickly produced by changing only the life module.

In addition, according to the recent trend of pursuing eco-friendliness in vehicle technology, the drive module is being developed in the direction of mounting a high-voltage battery (hereinbelow, simply referred to as a "battery").

In order to reduce the cost of manufacturing the vehicle and increase the usability of the living space for passengers, the PBV tends to have an enlarged wheelbase, and a driver's seat is placed as far forward as possible while keeping the overall length of the vehicle relatively small.

According to the above development trend, in a monocoque-type PBV, it is difficult to secure a space in a front portion of the vehicle to prepare for a frontal collision, and thus, in an event of a frontal collision of the vehicle, the amount of the power electric (PE) system provided in the front portion of the vehicle being pushed rearward of a vehicle body may increase. In this case, there is a risk of a collision between the PE system and the battery mounted to a lower portion of a center floor in the rear of the PE system.

The foregoing is intended merely to aid in the understanding of the background of embodiments of the present invention and is not intended to mean that embodiments of the present invention falls within the purview of the related art that is already known to those skilled in the art.

SUMMARY

The present disclosure relates to a battery protection structure. Particular embodiments relate to a technique that protects a battery mounted to a vehicle during an event of a frontal collision accident of a monocoque vehicle.

The present disclosure is intended to provide a battery protection structure resistant against a frontal collision of a monocoque vehicle, wherein in a monocoque-type PBV, and the like, in an event of a frontal collision accident of the vehicle, the structure is configured to efficiently support rearward slipping of a PE system to prevent a battery mounted to the vehicle from being shocked or damaged.

According to embodiments of the present disclosure, there is provided a battery protection structure resistant against a frontal collision of a monocoque vehicle, the battery protection structure including a sub frame mounted to a lower portion of a front side member, a stopper provided at a rear portion of the sub frame so as to be aligned with a PE mounting part in a longitudinal direction of a vehicle body, the PE mounting part being provided to mount a PE system to the sub frame, and a center side lower member provided to support a rear portion of the stopper to a center cross member.

A center side member may be connected to a rear portion of the front side member, the center cross member may be provided long in a transverse direction of the vehicle body to connect the center side member to another center side member at opposite sides of a vehicle, and the center side lower member of which a rear portion may be coupled to the center cross member and a front portion may be coupled to the stopper may be formed linearly long in the longitudinal direction of the vehicle body.

A center floor panel may be coupled to an upper portion of the center cross member and the center side lower member may form a closed section together with the center floor panel.

The stopper may be provided to protrude at a lower portion of a dash lower cross member provided long at a lower surface of a dash panel in the transverse direction of the vehicle body, the stopper connecting a rear portion of the front side member to a rear portion of another front side member at the opposite sides of the vehicle.

The center side lower member may have a front end connected to both of the dash lower cross member and the stopper.

The stopper may be provided to form a closed space below the dash lower cross member and at least one or more bulk heads may be provided in the closed space made up of the stopper and the dash lower cross member to partition the closed space into a plurality of closed spaces.

Each of the bulk heads may be a partition wall aligned in a longitudinal direction of the center side lower member and may be provided to partition the closed space made up of the stopper and the dash lower cross member.

An extension dash lower cross member may connect the front side member to a side sill so as to be aligned to the dash lower cross member in the transverse direction of the vehicle.

On an upper surface of the dash panel, a plurality of dash upper cross members formed long in the transverse direction of the vehicle body may be provided to be spaced apart from each other in the longitudinal direction of the vehicle, and while connecting the plurality of dash upper cross members to each other in the vehicle longitudinal direction, a dash upper member may be provided to be connected to the center cross member to face each other with the center floor panel located therebetween.

The dash upper member may be located at each of the opposite sides of the vehicle body and may be connected to the center side member to face each other with the center floor panel located therebetween.

The plurality of dash upper cross members may include a dash upper cross lower member provided at a portion where the dash panel and the center floor panel may be connected to each other and provided to connect the dash upper member to another dash upper member at the opposite sides and a dash upper cross middle member provided at a front upper side of the dash upper cross lower member and provided to connect upper ends of the opposite dash upper members to each other.

A center side upper member may be provided such that a front end thereof may be connected to the dash upper cross lower member and a rear end thereof may be connected to the center cross member with the center floor panel located therebetween.

The center side upper member may be coupled to the center side lower member while facing each other from above, with the center floor panel located therebetween.

A dash upper cross upper member may be provided at a front upper side of the dash upper cross middle member and a dash side front member may be provided between the dash upper cross middle member and the dash upper cross upper member, the dash side front member being formed long in the longitudinal direction of the vehicle body and connecting the dash upper cross middle member and the dash upper cross upper member to each other.

The dash side front member may be disposed to be partially overlapped with the dash upper member in the longitudinal direction of the vehicle body with the dash upper cross middle member located therebetween.

A front portion of the center side lower member may be connected to the dash lower cross member, the dash lower cross member may be provided long at a lower surface of the dash panel in the transverse direction of the vehicle body so as to connect rear portions of opposite front side members to each other, and the stopper may be provided to protrude on a front lower portion of the center side lower member.

According to embodiments of the present disclosure, for the monocoque-type PBV, etc., in an event of a frontal collision accident of the vehicle, the structure is configured to efficiently support rearward slipping of the PE system, so that the battery mounted to the vehicle can be efficiently prevented from being shocked or damaged.

DETAILED DESCRIPTION OF ILLUSTRATIVE EMBODIMENTS

Figure 1:
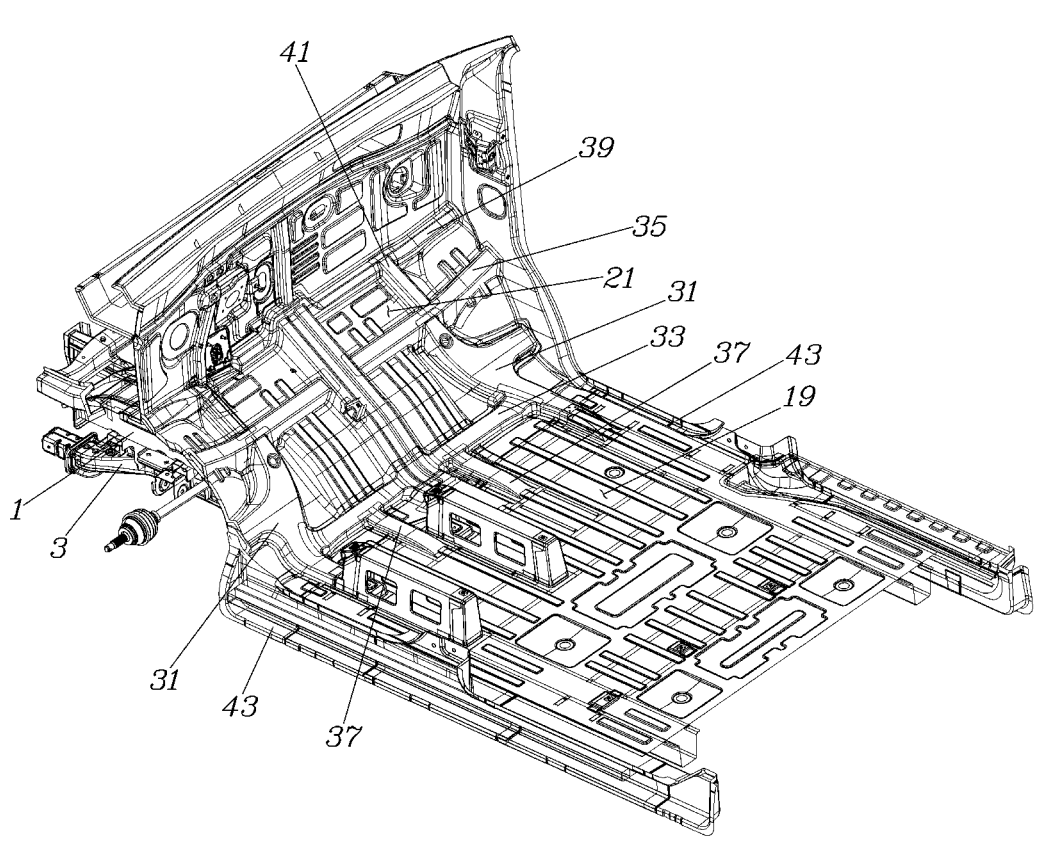
FIG. 1 is a view showing a part of the vehicle body to which a battery protection structure resistant against a frontal collision of a monocoque vehicle according to embodiments of the present disclosure is applied.
Figure 2:
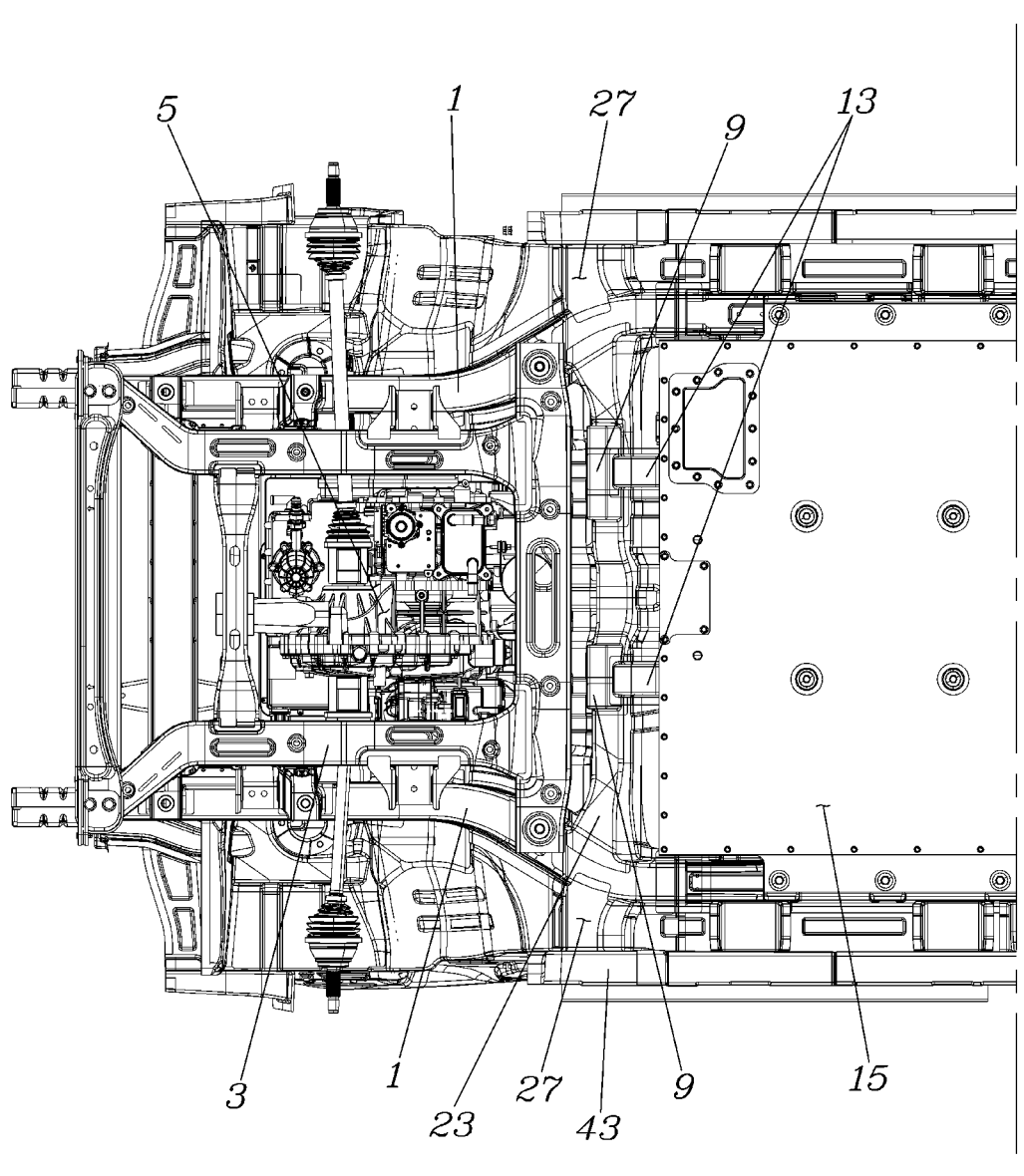
FIG. 2 is a view showing a lower portion of the vehicle body in FIG. 1 and the view showing a mounted battery.
Figure 3:
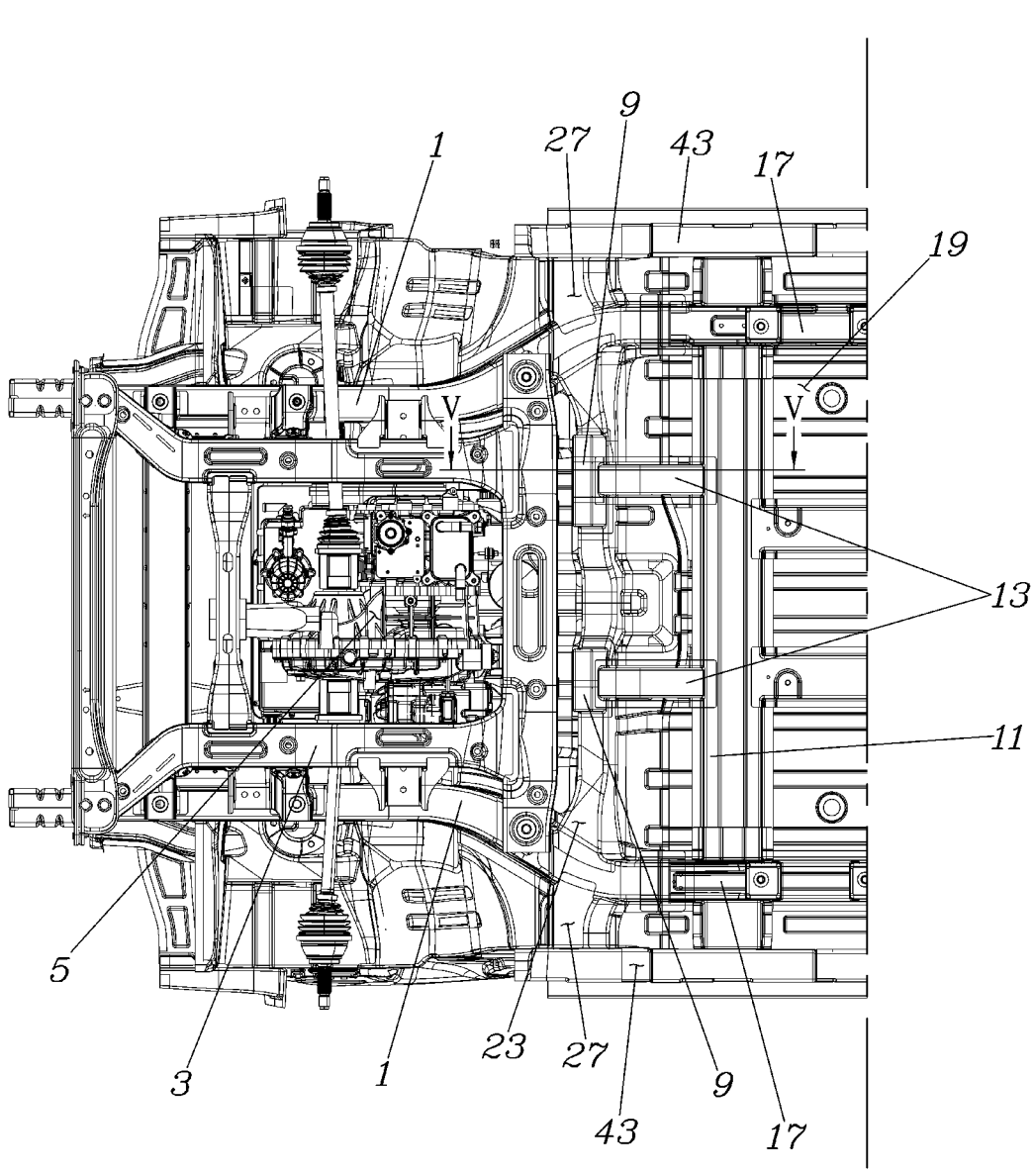
FIG. 3 is a view showing a state without the battery in FIG. 2.
Figure 4:
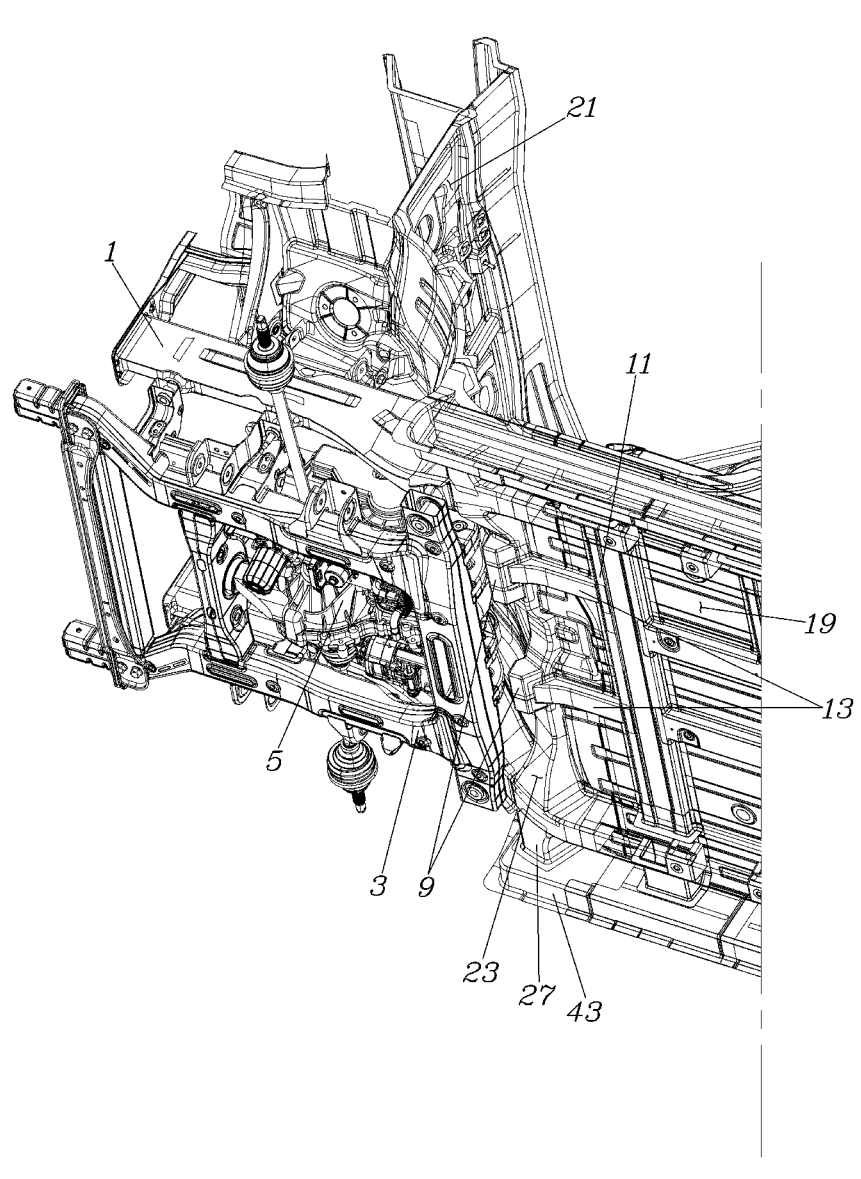
FIG. 4 is a perspective view showing a state in FIG. 3, the view being taken from the lower side of a vehicle body.

Hereinbelow, preferred embodiments described in the specification will be described in detail with reference to the accompanying drawings, and regardless of the reference numerals, the same reference numerals will refer to the same or like parts, and redundant descriptions thereof will be omitted.

The suffixes "module" and "part" for the components used in the following description are given or combined in consideration of only the ease of writing the specification and do not have distinct meanings or roles by themselves.

In the following description, if it is decided that the detailed description of a known function or configuration related to embodiments of the invention makes the subject matter of embodiments of the invention unclear, the detailed description is omitted. Furthermore, the accompanying drawings are only for understanding of the preferred embodiments of the present invention, and the technical ideas disclosed in the specification are not limited by the accompanying drawings, and those skilled in the art will appreciate that various modifications, additions and substitutions are possible, without departing from the scope and spirit of the invention as disclosed in the accompanying claims.

It will be understood that, although the terms first and/or second, etc. may be used herein to describe various elements, these elements should not be limited by these terms. These terms are only used to distinguish one element from another element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Referring to FIGS. 1 to 10, a battery protection structure resistant against a frontal collision of a monocoque vehicle according to embodiments of the present disclosure includes a sub frame 3 mounted to a lower portion of a front side member 1, a stopper 9 installed behind the sub frame 3 so as to be aligned at a PE mounting part 7 in the longitudinal direction of the vehicle body, the PE mounting part 7 being provided to mount a PE system 5 to the sub frame 3, and a center side lower member 13 provided to support a rear portion of the stopper 9 by a center cross member 11.

In other words, according to embodiments of the present disclosure, the stopper 9 is provided behind the PE mounting part 7 of the sub frame 3 and the stopper 9 is supported by the center side lower member 13, so that in an event of a frontal collision of a vehicle, the PE system 5 pushed rearward is efficiently supported, and it is possible to efficiently prevent an impact from being applied to a battery 15 located behind the PE system 5.

For example, the PE system 5 is referred to as an electric powertrain device including a motor and a reducer that are operated by power supplied from the battery 15.

A center side member 17 is connected to a rear portion of the front side member 1 in the longitudinal direction of the vehicle body, and the center cross member 11 is provided long in a transverse direction of the vehicle body so as to connect center side members 17 provided at opposite sides of the vehicle.

A rear portion of the center side lower member 13 is coupled to the center cross member 11 and a front portion thereof is coupled to the stopper 9, and the center side lower member 13 is formed linearly long in the longitudinal direction of the vehicle body.

Therefore, when the PE system 5 is pushed rearward due to a frontal collision accident, the stopper 9 is firmly supported by the center side lower member 13 at the rear side with the center side lower member 13 being supported by the center cross member 11, thereby rearward pushing of the PE system 5 is limited.

A center floor panel 19 is coupled to an upper portion of the center cross member 11, and the center side lower member 13 forms a closed section together with the center floor panel 19.

Of course, the center cross member 11 also forms a closed section together with the center floor panel 19, so that the closed section made up of both the center side lower member 13 and the center floor panel 19 is disposed long in the longitudinal direction of the vehicle, and at the rear side thereof, the closed section made up of both of the center cross member 11 and the center floor panel 19 is disposed long in the transverse direction of the vehicle. Therefore, the structure of the closed sections can firmly support a load applied rearward from the stopper 9.

The stopper 9 may be provided to protrude at a lower portion of a dash lower cross member 23 that is provided long at a lower surface of a dash panel 21 in the transverse direction of the vehicle body, thereby connecting a rear portion of the front side member 1 to a rear portion of another front side member 1 that are located at opposite sides of the vehicle.

Figure 5:
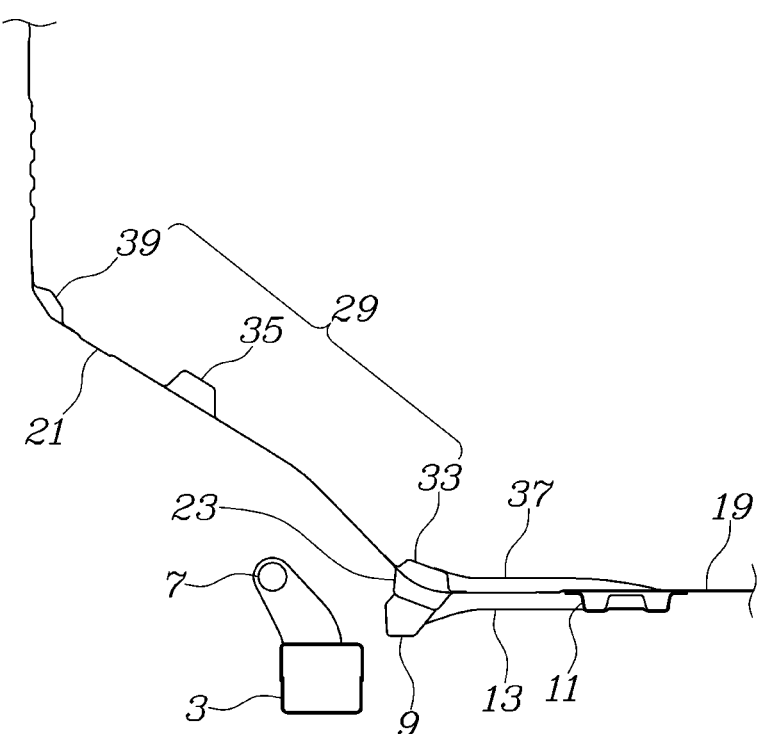
FIG. 5 is a sectional view taken along line V-V in FIG. 3.
Figure 6:
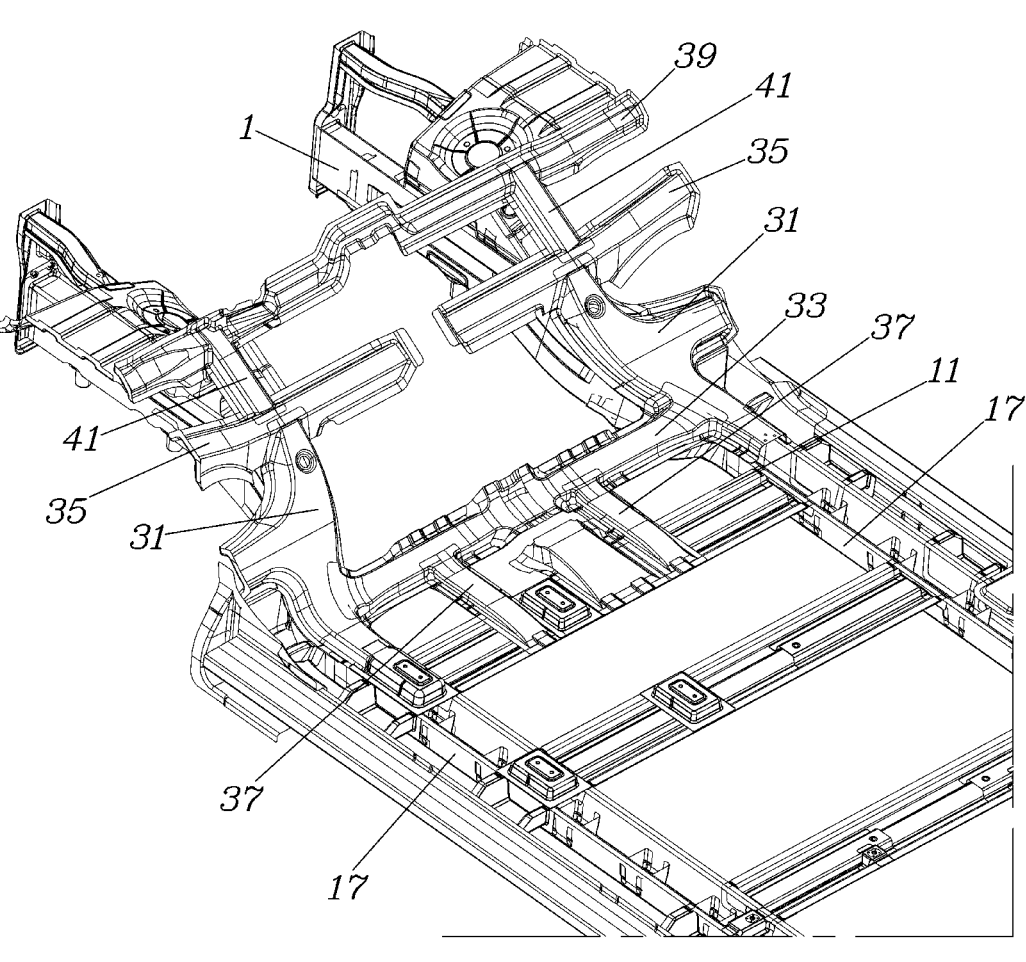
FIG. 6 is a view showing main parts of embodiments of the present disclosure abstracted from FIG. 1.
Figure 7:
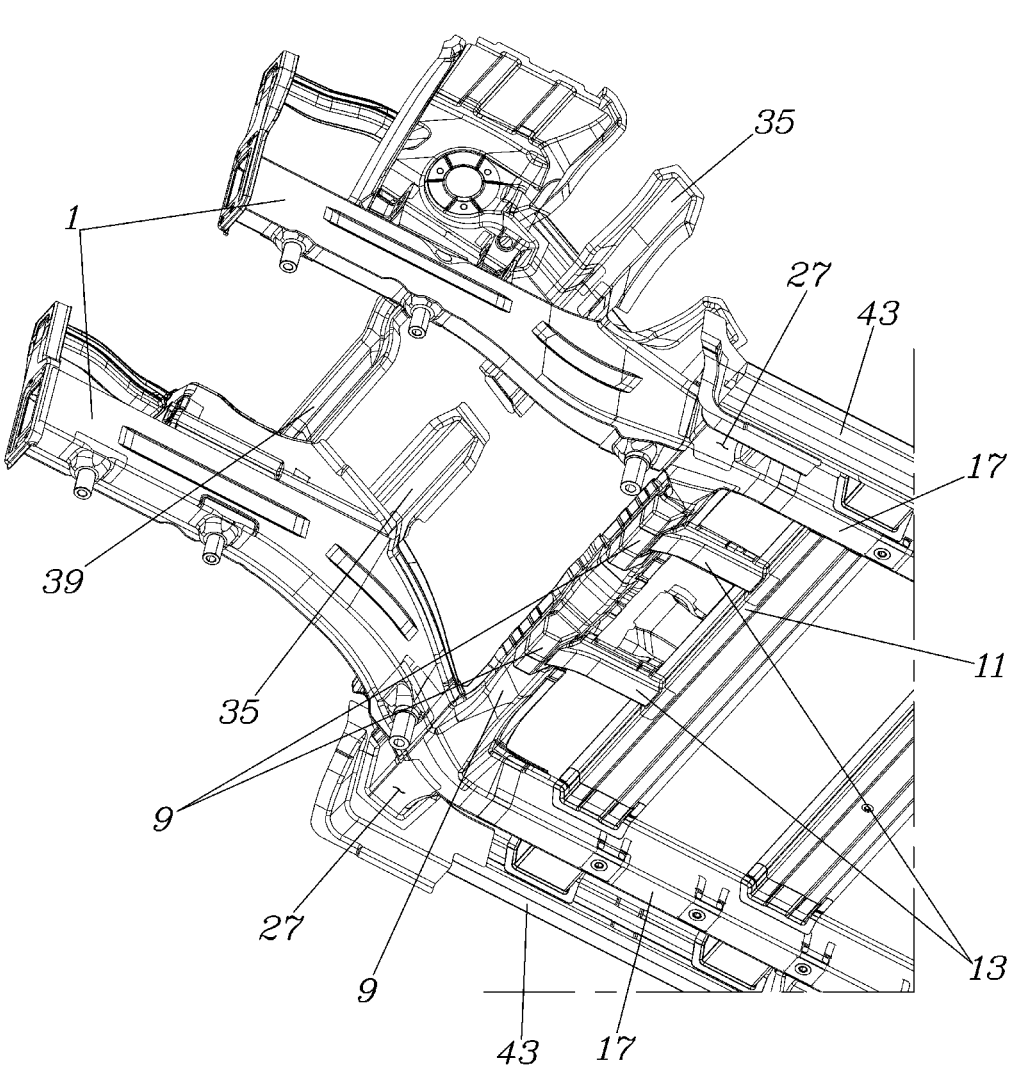
FIG. 7 is a view of the state of FIG. 6 and taken from the lower side.
Figure 8:
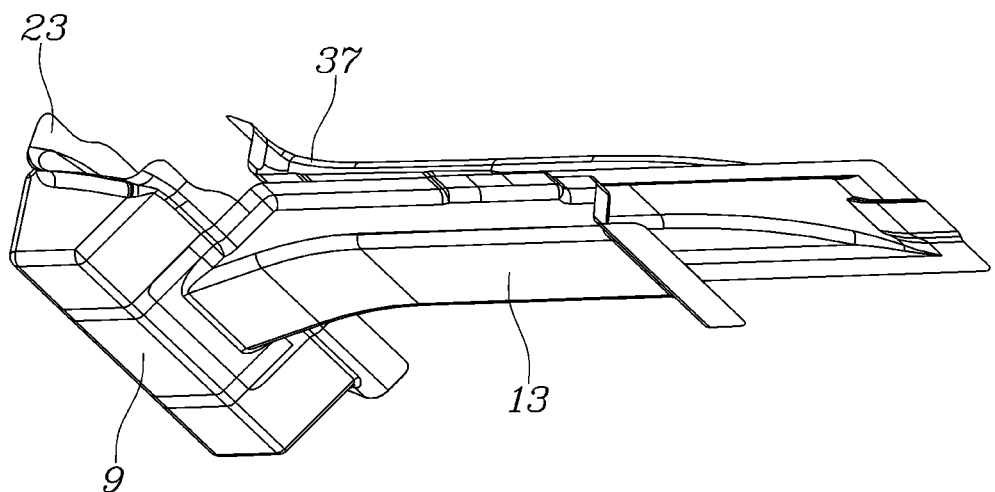
FIG. 8 is a view showing a stopper, a center side lower member, and a center side upper member of embodiments of the present disclosure.
Figure 9:
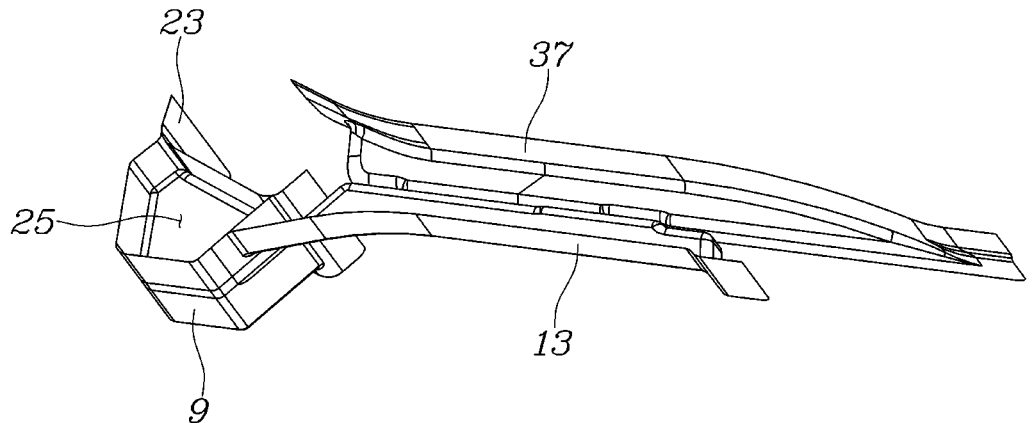
FIGS. 9 and 10 are partially cut views of FIG. 8.
Figure 10:
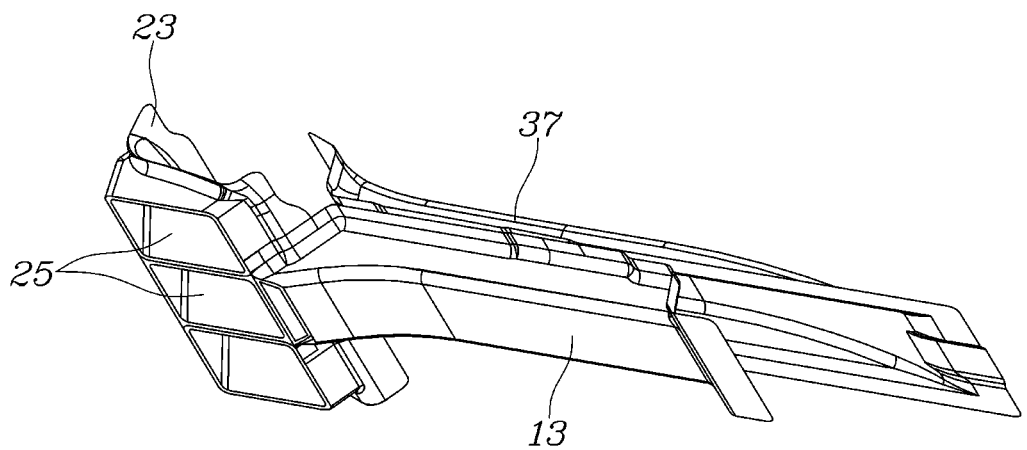

In other words, in the embodiment shown in FIG. 5, the stopper 9 is provided to protrude at the lower portion of the dash lower cross member 23.

At this point, the center side lower member 13 is configured to be connected, at a front end thereof, to the dash lower cross member 23 and the stopper 9.

Therefore, when a load is applied to the stopper 9 while the PE system 5 is pushed rearward, the stopper 9 forms a robust support state by the grid structure made up of the dash lower cross member 23, the center side lower member 13, the center cross member 11, and the center side member 17.

The stopper 9 is provided to form a closed space below the dash lower cross member 23, and in the closed space made up of the stopper 9 and the dash lower cross member 23, at least one or more bulk heads 25 are provided to partition the closed space into a plurality of closed spaces, so that the stiffness of the stopper 9 can be sufficiently secured.

Herein, the bulk head 25 is a partition wall that is aligned in a longitudinal direction of the center side lower member 13, and the bulk head 25 is provided to partition the closed space made up of the stopper 9 and the dash lower cross member 23.

Figure 11:
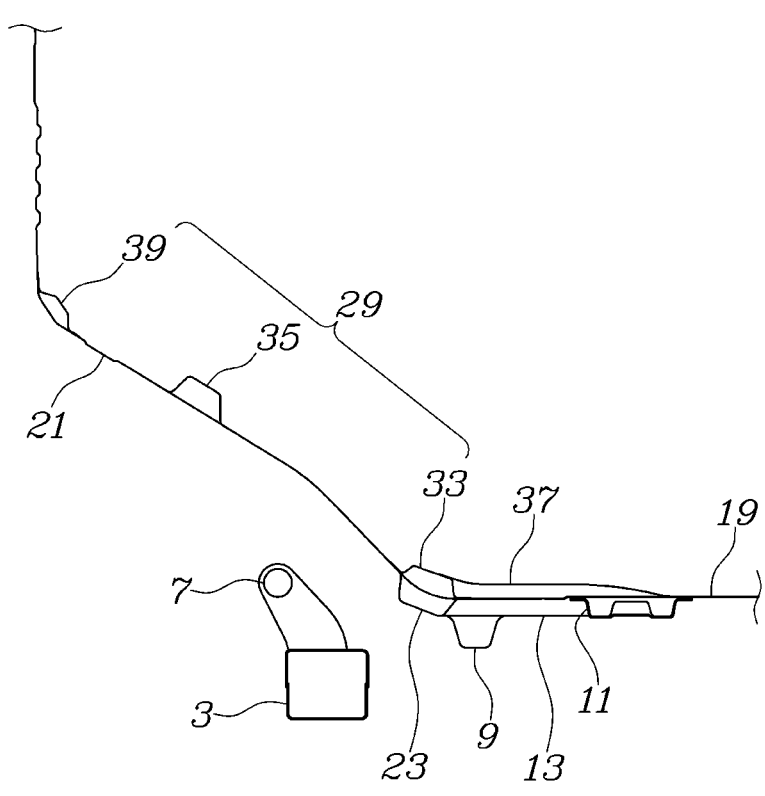
FIG. 11 is a view showing another embodiment of the present disclosure in a view point of FIG. 5.

For example, FIG. 11 is a view showing another embodiment in which other components are the same as in FIG. 5, but there are differences in that the front portion of the center side lower member 13 is connected only to the dash lower cross member 23, and the stopper 9 is provided to protrude on a front lower portion of the center side lower member 13.

Meanwhile, in embodiments of the present disclosure, an extension dash lower cross member 27 is provided to be aligned with the dash lower cross member 23 in the transverse direction of the vehicle, and the extension dash lower cross member 27 connects the front side member 1 to a side sill 43.

Therefore, the dash lower cross member 23 is supported by the side sill 43 via the extension dash lower cross member 27, as well as the center side member 17, so that a more robust support state can be implemented.

A plurality of dash upper cross members 29 is formed long on an upper surface of the dash panel 21 in the transverse direction of the vehicle body and are provided to be spaced apart from each other in the longitudinal direction of the vehicle, and a dash upper member 31 is provided to be connected to the center cross member 11 in a facing state with the center floor panel 19 that is located between the dash upper member 31 and the center cross member 11 while connecting the plurality of dash upper cross members 29 to each other in the longitudinal direction of the vehicle.

The dash upper members 31 are located at each of the opposite sides of the vehicle body and are connected to the center side member 17 to face each other with the center floor panel 19 located therebetween.

The plurality of dash upper cross members 29 includes a dash upper cross lower member 33 provided to connect the opposite dash upper members 31 to each other at a portion where the dash panel 21 and the center floor panel 19 are connected to each other and a dash upper cross middle member 35 provided to connect upper ends of the opposite dash upper members 31 to each other while located at the front upper side of the dash upper cross lower member 33.

Furthermore, a center side upper member 37 is provided. The center side upper member 37 includes a front end connected to the dash upper cross lower member 33 and a rear end connected to the center cross member 11 with the center floor panel 19 located therebetween.

At this point, the center side upper member 37 is coupled to the center side lower member 13 while facing each other from above, with the center floor panel 19 located therebetween.

Meanwhile, a dash upper cross upper member 39 is provided at a front upper side of the dash upper cross middle member 35, a dash side front member 41 is provided between the dash upper cross middle member 35 and the dash upper cross upper member 39, and the dash side front member 41 connects the dash upper cross middle member 35 to the dash upper cross upper member 39 while being formed long in the longitudinal direction of the vehicle body.

Furthermore, the dash side front member 41 is disposed to be partially overlapped with the dash upper member 31 in the longitudinal direction of the vehicle body, with the dash upper cross middle member 35 located therebetween.

Therefore, a frontal impact transmitted rearward through the dash panel 21 may be efficiently supported by the dash upper cross upper member 39, the dash side front member 41, the dash upper cross middle member 35, the dash upper member 31, the dash upper cross lower member 33, the center side upper member 37, and the center side member 17.

Specifically, for a load acting toward a rear lower side of the dash panel 21 due to rearward slipping of the PE system 5, the dash upper cross lower member 33, the center side upper member 37, etc. provide more robust support stiffness together with the center side lower member 13, so that it is possible to efficiently protect the battery 15 mounted to a lower portion of the center floor panel 19 from a frontal collision accident.

Although the preferred embodiments of the present invention have been disclosed in detail only with respect to the above specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. A battery protection structure comprising:
a sub frame mounted to a lower portion of a pair of front side members;
a stopper provided at a rear portion of the sub frame and aligned with a power electric (PE) mounting part in a longitudinal direction of a vehicle body, the PE mounting part being configured to mount a PE system to the sub frame; and
a center side lower member coupled to a center cross member and configured to support a rear portion of the stopper,
wherein:
a rear portion of the center side lower member is coupled to the center cross member,
a front portion of the center side lower member is coupled to the stopper, and
the center side lower member is provided linearly long in the longitudinal direction of the vehicle body.

2. The battery protection structure of claim 1, further comprising:
a pair of center side members at opposite sides of the vehicle body, the center side members being connected to rear portions of the front side members,
wherein the center cross member is provided long in a transverse direction of the vehicle body to connect the pair of center side members to each other.

3. The battery protection structure of claim 1, further comprising:
a center floor panel coupled to an upper portion of the center cross member,
wherein the center side lower member defines a closed section together with the center floor panel.

4. The battery protection structure of claim 3, wherein:
the stopper protrudes at a lower portion of a dash lower cross member provided long at a lower surface of a dash panel in a transverse direction of the vehicle body, and
the stopper connects rear portions of the front side members to each other.

5. The battery protection structure of claim 4, wherein:
the front portion of the center side lower member is connected to the dash lower cross member provided long at the lower surface of the dash panel in the transverse direction of the vehicle body to connect the rear portions of the front side members to each other, and
the stopper protrudes on a front lower portion of the center side lower member.

6. The battery protection structure of claim 4, wherein the center side lower member has a front end connected to the dash lower cross member and the stopper.

7. The battery protection structure of claim 6, wherein:
the stopper defines a closed space below the dash lower cross member, and
a bulk head is provided in the closed space defined by the stopper and the dash lower cross member to partition the closed space into a plurality of closed spaces.

8. The battery protection structure of claim 7, wherein the bulk head is a partition wall aligned in the longitudinal direction of the center side lower member to partition the closed space defined by the stopper and the dash lower cross member.

9. The battery protection structure of claim 4, further comprising extension dash lower cross members respectively connecting the front side members to side sills to be aligned to the dash lower cross member in the transverse direction of the vehicle body.

10. A battery protection structure comprising:
a sub frame mounted to a lower portion of a pair of front side members;
a stopper provided at a rear portion of the sub frame and aligned with a power electric (PE) mounting part in a longitudinal direction of a vehicle body, the PE mounting part being configured to mount a PE system to the sub frame;
a center side lower member configured to support a rear portion of the stopper to a center cross member, wherein:
a rear portion of the center side lower member is coupled to the center cross member and a front portion of the center side lower member is coupled to the stopper, and
the center side lower member is provided linearly long in the longitudinal direction of the vehicle body;
a center floor panel coupled to an upper portion of the center cross member, wherein the center side lower member defines a closed section together with the center floor panel;
a dash panel;
a dash lower cross member provided long at a lower surface of the dash panel in a transverse direction of the vehicle body, wherein:
the stopper protrudes at a lower portion of the dash lower cross member, and
the stopper connects rear portions of the front side members to each other;
a plurality of dash upper cross members on an upper surface of the dash panel, the dash upper cross members provided long in the transverse direction of the vehicle body to be spaced apart from each other in the longitudinal direction of the vehicle body; and
a pair of dash upper members connecting the plurality of dash upper cross members to each other in the longitudinal direction of the vehicle body and connected to the center cross member to face each other with the center floor panel located therebetween.

11. The battery protection structure of claim 10, wherein the pair of dash upper members are respectively located at opposite sides of the vehicle body and are connected to a pair of center side members to face each other with the center floor panel located therebetween.

12. The battery protection structure of claim 11, wherein the plurality of dash upper cross members comprises:
a dash upper cross lower member provided at a portion where the dash panel and the center floor panel are connected to each other and connecting the pair of dash upper members to each other; and
a dash upper cross middle member provided at a front upper side of the dash upper cross lower member and connecting upper ends of the pair of dash upper members to each other.

13. The battery protection structure of claim 12, further comprising a center side upper member having a front end connected to the dash upper cross lower member and a rear end connected to the center cross member with the center floor panel located therebetween.

14. The battery protection structure of claim 13, wherein the center side upper member is coupled to the center side lower member while facing each other from above with the center floor panel located therebetween.

15. The battery protection structure of claim 13, further comprising:

a dash upper cross upper member provided at a front upper side of the dash upper cross middle member; and a dash side front member provided between the dash upper cross middle member and the dash upper cross upper member, the dash side front member being provided long in the longitudinal direction of the vehicle body and connecting the dash upper cross middle member and the dash upper cross upper member to each other.

16. The battery protection structure of claim 15, wherein the dash side front member is disposed to be partially overlapped with the dash upper members in the longitudinal direction of the vehicle body with the dash upper cross middle member located therebetween.

17. A vehicle comprising:

a vehicle body;

a sub frame mounted to a lower portion of a pair of front side members;

a pair of stoppers provided at a rear portion of the sub frame and aligned with a power electric (PE) mounting part in a longitudinal direction of the vehicle body;

a PE system mounted to the sub frame by the PE mounting part;

a pair of center side members at opposite sides of the vehicle body, the center side members being connected to rear portions of the front side members;

a center cross member provided long in a transverse direction of the vehicle body and connecting the center side members to each other;

a pair of center side lower members each having a rear portion coupled to the center cross member and a front portion coupled to and configured to support rear portions of the stoppers, respectively;

a center floor panel coupled to an upper portion of the center cross member; and a dash panel and a dash lower cross member provided long at a lower surface of the dash panel in the transverse direction of the vehicle body, wherein:

the stoppers protrude at lower portions of the dash lower cross member, and the stoppers connect the rear portions of the front side members to each other.

18. The vehicle of claim 17, further comprising side sills and extension dash lower cross members respectively connecting the front side members to the side sills to be aligned to the dash lower cross member in the transverse direction of the vehicle body.

* * * * *